(12) United States Patent
Gross

(10) Patent No.: US 11,964,829 B2
(45) Date of Patent: Apr. 23, 2024

(54) GRIPPER FOR A PICKING DEVICE

(71) Applicant: Becton Dickinson Rowa Germany GmbH, Kelberg (DE)

(72) Inventor: Dietmar Gross, Kelberg (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 888 days.

(21) Appl. No.: 17/025,474

(22) Filed: Sep. 18, 2020

(65) Prior Publication Data

US 2022/0089383 A1    Mar. 24, 2022

(51) Int. Cl.
| | |
|---|---|
| B65G 47/91 | (2006.01) |
| B25J 13/08 | (2006.01) |
| B25J 15/00 | (2006.01) |
| B25J 15/06 | (2006.01) |
| B25J 17/02 | (2006.01) |

(52) U.S. Cl.
CPC ......... B65G 47/914 (2013.01); B65G 47/918 (2013.01); B25J 13/08 (2013.01); B25J 15/008 (2013.01); B25J 15/0616 (2013.01); B25J 17/02 (2013.01); B65G 2207/02 (2013.01)

(58) Field of Classification Search
CPC ............... B65G 47/914; B65G 47/918; B65G 2207/02; B25J 15/008; B25J 15/0616; B25J 15/0683
See application file for complete search history.

(56) References Cited

U.S. PATENT DOCUMENTS

| | | | | |
|---|---|---|---|---|
| 8,991,887 B2* | 3/2015 | Shin | .................. | H01L 21/67766 |
| | | | | 294/213 |
| 9,498,887 B1* | 11/2016 | Zevenbergen | ....... | B25J 15/0616 |
| 2005/0168001 A1* | 8/2005 | Perlman | ............... | B25J 15/0616 |
| | | | | 294/189 |
| 2014/0225391 A1* | 8/2014 | Kuolt | ................... | B25J 15/0683 |
| | | | | 294/183 |
| 2019/0022855 A1* | 1/2019 | Hellenbrand | ........ | B25J 15/0213 |

FOREIGN PATENT DOCUMENTS

| | | |
|---|---|---|
| CN | 111099235 A | 5/2020 |
| EP | 3431421 A1 | 1/2019 |
| WO | WO-2020169044 A1 | 8/2020 |

OTHER PUBLICATIONS

Extended European Search Report for Application No. 20196786.6, dated Mar. 9, 2021, 14 pages including machine translation.

* cited by examiner

*Primary Examiner* — Dean J Kramer
(74) *Attorney, Agent, or Firm* — Morgan, Lewis & Bockius LLP

(57) ABSTRACT

A gripper for a picking device for small piece goods is provided. The gripper includes a delivery table extending in a first horizontal direction and a second horizontal direction orthogonal to the first horizontal direction, a gripping jaw guide assembly having two gripping jaws extending in the first horizontal direction over the delivery table, wherein at least one of the gripping jaws is movable in the second horizontal direction, and a drive unit which is coupled to the gripping jaw guide assembly and configured to move the gripping jaw guide assembly in the first horizontal direction. At least one of the gripping jaws is configured as a suction jaw and has a suction device having a suction surface for suctioning a small piece good, wherein a vacuum can be applied on the suction device using a suction line.

18 Claims, 3 Drawing Sheets

GRIPPER FOR A PICKING DEVICE

The present disclosure relates to a gripper for a picking device for small piece goods, in particular pharmaceutical packages and food supplement packages.

SUMMARY

One or more embodiments provide a gripper for a picking device having horizontal storage surfaces for storing small piece goods. The gripper includes a delivery table extending in a first horizontal direction and a second horizontal direction orthogonal to the first horizontal direction, a gripping jaw guide assembly having two gripping jaws extending in the first horizontal direction over the delivery table, wherein at least one of the gripping jaws is movable in the second horizontal direction, and a drive unit which is coupled to the gripping jaw guide assembly and configured to move the gripping jaw guide assembly in the first horizontal direction. At least one of the gripping jaws is a suction jaw comprising a suction device having a suction surface for suctioning a small piece good and a suction line, wherein the suction device is configured to apply a vacuum using the suction line.

One or more embodiments provide a picking device for small piece goods. The picking device includes a gripper having a delivery table extending in a first horizontal direction and a second horizontal direction orthogonal to the first horizontal direction and a gripping jaw guide assembly having two gripping jaws extending in the first horizontal direction over the delivery table, wherein at least one of the gripping jaws is movable in the second horizontal direction, and wherein at least one of the gripping jaws is a suction jaw. The suction jaw includes a suction device having a suction surface for suctioning a small piece good and a suction line, wherein the suction device is configured to apply a vacuum using the suction line. The gripper also includes a drive unit coupled to the gripping jaw guide assembly and configured to move the gripping jaw guide assembly in the first horizontal direction. The picking device also includes a sensor unit disposed on the gripper and a control device coupled to the gripper.

The foregoing and other features, aspects and advantages of the disclosed embodiments will become more apparent from the following detailed description and accompanying drawings.

BRIEF DESCRIPTION OF THE DRAWINGS

In the following, one or more embodiments of a gripper according to the disclosure is described with reference to the drawings.

DETAILED DESCRIPTION

Figure 1A:
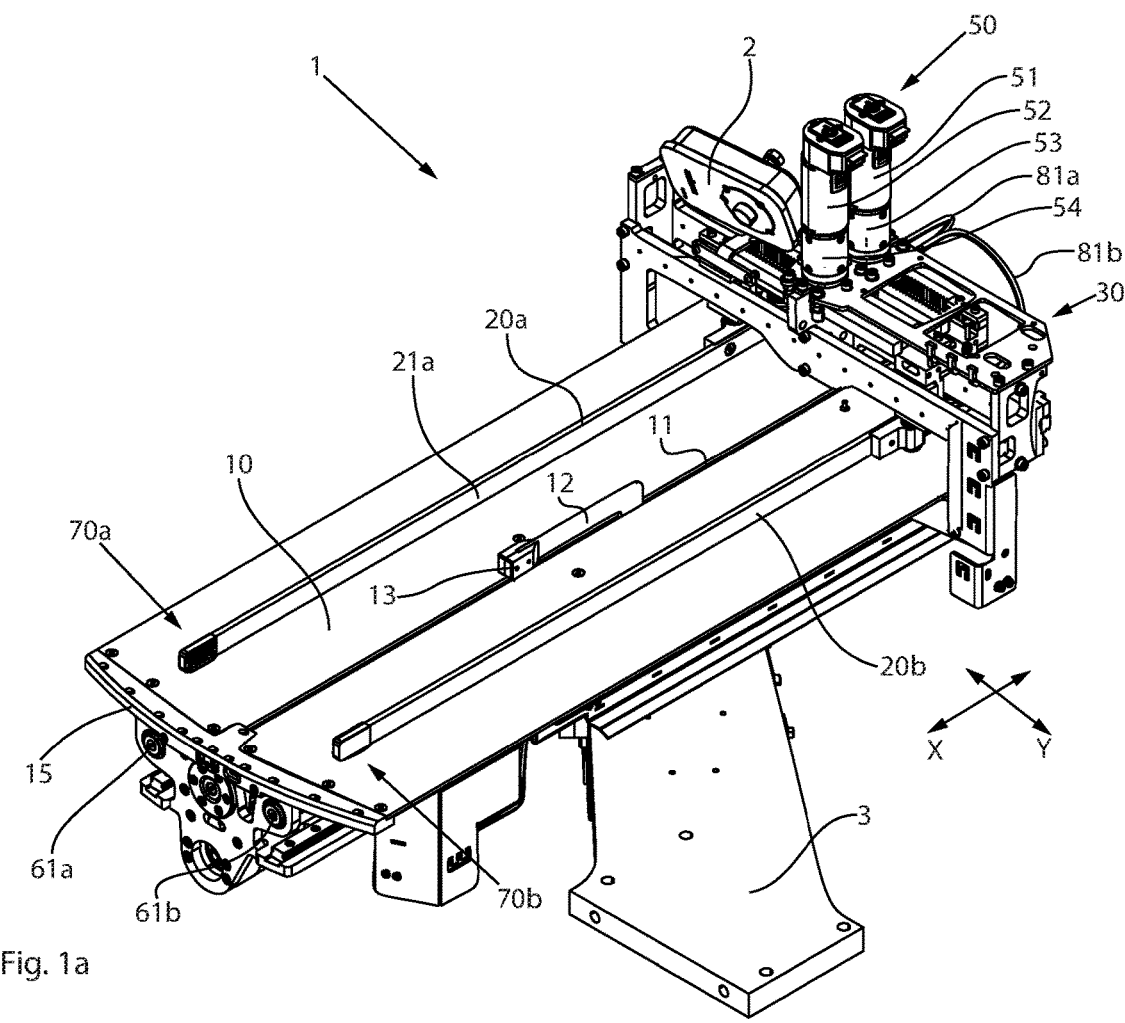
FIG. 1a is a top perspective view of a gripper, according to aspects of the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Known grippers of operating systems for picking devices usually comprise two gripping jaws designed as clamping jaws, which are movable in the longitudinal direction of a delivery table of the gripper (e.g., X direction) in order, for example, to be moved beyond the end face of the delivery table to a storage place of a pharmaceutical package. In order to move a pharmaceutical package from the delivery location to the delivery table, one type of known gripper is operated in such a way that the clamping jaws are first slightly moved together in a second direction (e.g., Y direction) orthogonally to the first direction and then at least one of the clamping jaws is pivoted on the base so that the tips of the clamping jaws approach each other. If the clamping jaws were only moved together on contact with a small piece good, the small piece good would only be held by the adhesive friction between the inner surface of the clamping jaws and the small piece good. Even with relatively light small piece goods or pharmaceutical packages, this can lead to insufficient adhesive friction when the clamping jaws move back (in practice, very quickly) to the delivery table and the small piece good is not properly pulled onto the delivery table. In the case of heavy small piece goods, it may simply be impossible to move them using adhesive friction alone. For this reason, at least one of the clamping jaws is pivoted, so that the small piece good can be moved safely even when there is insufficient adhesive friction due to the clamping jaw tips which are moved together at the front.

Although small piece goods can be dispensed by pivoting, which cannot be dispensed by using clamps only, it is also problematic during the pivoting to dispense heavy small piece goods, since the forces generated by pivoting are sometimes insufficient to pull heavy small piece goods from a delivery location onto a gripper.

Accordingly, it is desirable to provide a gripper with which small piece goods with greater weight can be moved safely from a delivery location onto the gripper.

Such a gripper may include a delivery table extending in a first horizontal direction (e.g., X direction) and a second horizontal direction (e.g., Y direction) which is orthogonal to the first horizontal direction, a gripping jaw guide assembly having two gripping jaws extending in the first horizontal direction over the delivery table, wherein at least one of the gripping jaws is movable in the second horizontal direction, and a drive unit coupled to the gripping jaw guide assembly, with which the clamping jaw guide assembly is movable in the first horizontal direction. At least one of the gripping jaws may be designed as a suction jaw with at least one suction device having a suction surface for suctioning a small piece good, wherein a suction device can be subjected to a vacuum using a suction line.

When using at least one suction gripper, gripping and carrying, when a gripping jaw is not pivoted, is also carried out by adhesive friction between the small piece good and the gripping jaw, wherein this adhesive friction is increased by the vacuum applied. However, primarily, the small piece good is held due to the pressure difference between the evacuated space of the suction device and the environment such that the small piece good is quasi pressed by the ambient pressure. Because of this pressing, there is no longer a risk that a small piece good will no longer be carried if the acceleration is too great or the weight is too great, without the need to pivot one of the gripping jaws or a suction jaw at the base. The use of a suction device for the safe handling of a small piece good has many advantages. "Vacuum" in handling technology is understood to mean gentle handling of the small piece goods, low weight of the suction device itself, and low maintenance requirements due to the elimination of mechanical components.

Another significant advantage of using a suction jaw or the elimination of the need of pivoting a gripping or suction jaw is that when using a suction jaw, for example, only the first of a plurality of the same small piece goods lying in a row can be safely moved from the delivery place thereof. If pivoting was necessary to move a small piece good, it is hardly possible to move only the front small piece good, for example, when a plurality of small piece goods are unfavorably stored in a row with known grippers.

It is substantial for aspects of the disclosure that a suction device can be subjected to negative pressure via a suction line. This can be done by guiding the suction line from outside of the gripper to the suction device. However, due to the fast movements of a suction jaw, this can lead to considerable loads on the suction line. A suction line which is brought in from the outside can also interfere with the movement of a suction jaw to a delivery location, for example, by moving adjacent small piece goods. In aspects of the disclosure, it is therefore provided that the suction line extends at least in portions through the suction jaw itself or is guided thereon.

In order to keep the movement path of a suction jaw towards the small piece good to be moved as small as possible, it is provided in aspects of the disclosure that the suction device of a suction jaw is arranged at the distal end of the suction jaw.

Almost any suction surface can be used in the case of suction devices. In adaptation to the shape of a suction jaw, it is provided in aspects of the disclosure that the suction surface of one suction device is designed to be oval-shaped.

The use of a gripping jaw designed as a suction jaw increases the speed at which a small piece good can be moved from a delivery location to the delivery table of the gripper. However, a suction device can only work with small piece goods having specific surface properties. For example, the surface must not be too roughened, not have a large number of grooves or be too curved. Thus, dispensing bottle-shaped small piece goods can be problematic if they are stored upright and have a small radius and therefore a strong surface curvature.

In aspects of the disclosure, it is provided that two gripping jaws are designed as suction jaws, wherein one of the suction devices has a suction surface which is adapted to curved surfaces of small piece goods.

Even when using two suction devices, one of which is adapted to curved surfaces, it can happen that the small piece good is designed (e.g. shape, surface) in such a way that it cannot be removed by suction alone. In order to be able to store or dispense such unusual small piece goods in the picking device, it is therefore provided in aspects of the disclosure that at least one of the gripping or suction jaws is pivotably arranged on the gripping jaw guide assembly. A corresponding design of the gripper does require a specific amount of additional construction work, but the flexibility of the gripper is substantially increased. Typical small piece goods, especially pharmaceutical or food supplement packages, can be moved faster and without pivoting from a drop location, and unusual small piece goods can also be handled.

At least the approximate weights of the small piece goods to be moved are usually known. The energy consumption when using a suction device increases with the vacuum applied. In order to keep said vacuum as low as possible for the safe movement of a small piece good, it is provided in aspects of the disclosure that an adhesive element having an increased coefficient of adhesive friction compared to a suction jaw surface is arranged adjacent to a suction surface. The adhesive friction is thus increased and the vacuum can be kept at a lower level. In this context, the adhesive element may be configured as a plurality of elastic elevations. This is particularly sensible since the suction device has a suction cup that projects above the level of the suction jaw surface if no small piece good is suctioned.

Figure 1B:
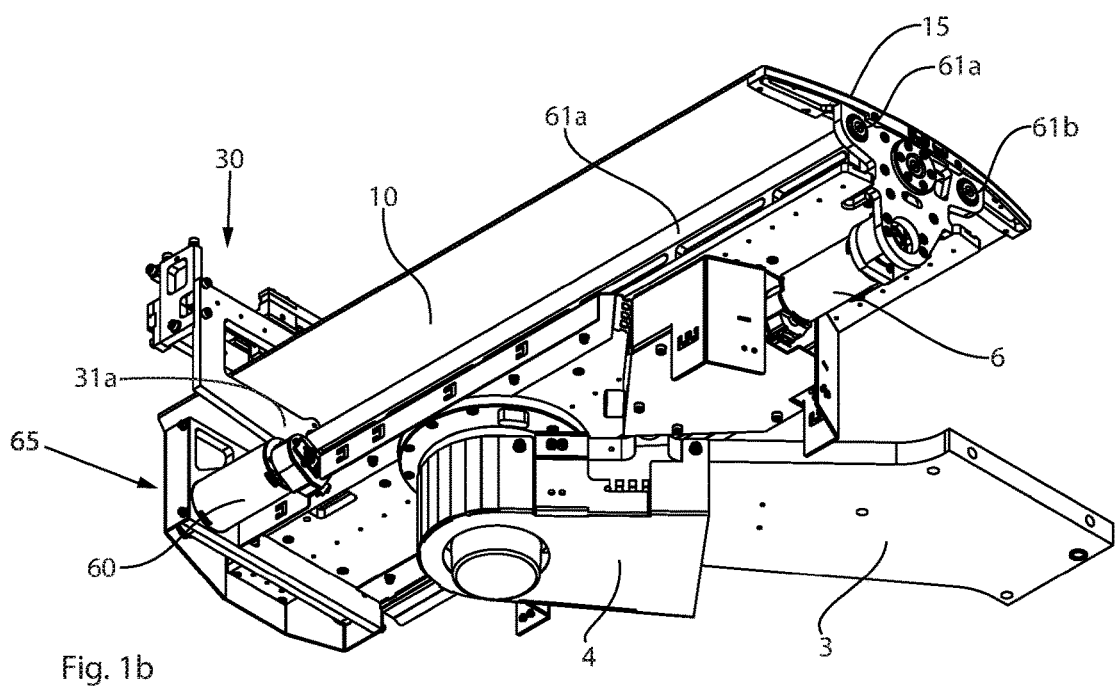
FIG. 1b is a bottom perspective view of the gripper of FIG. 1a, according to aspects of the disclosure.

FIGS. 1a and 1b show two perspective views of one or more embodiments of a gripper 1, according to aspects of the disclosure, wherein FIG. 1a shows a perspective view from above and FIG. 1b shows a perspective view from below. The gripper 1, according to aspects of the disclosure, is part of an otherwise not shown operating device for a picking device and includes a delivery table 10 having an elongated central opening 11, which extends in a first horizontal direction (X direction) of the delivery table 10. A sliding element 12 having a widened sliding head 13 is arranged in the elongated central opening 11. The sliding element 12 is movable in the elongated central opening 11 by a drive 6 shown in FIG. 1b, in order to move a small piece good (not shown) lying on the delivery table 10 via a storage and dispensing end face 15 of the gripper 1 to a drop location.

The gripper 1 includes a gripping jaw guide assembly 30, which is shown opposite the storage and dispensing end face 15, which is coupled to a drive unit 65 by which the gripping jaw guide assembly 30 can be moved in the X direction. The drive unit 65 includes a motor 60, which drives two linear axles 61a, 61b, wherein a rotary movement of the linear axles 61a, 61b moves slides 40a, 40b, 41a, 41b in the X direction (see FIG. 2). The slides 40a, 40b, 41a, 41b are connected to portions 31a, 31b (see FIGS. 1b and 2) which engage under the delivery table 10, so that a rotary movement of the linear axles 61a, 61b causes a movement in the X direction of the gripping jaw guide assembly 30.

The gripping jaw guide assembly 30 comprises two gripping jaws, both of which are designed as suction jaws 20a, 20b having opposing suction jaw surfaces 21a, 21b in the illustrated embodiment of the gripper according to aspects of the disclosure. In aspects of the gripper according to the disclosure shown, the gripping jaw guide assembly 30 includes a drive unit 50 with two drives 51, 52 and gears 53, 54 assigned to them. As is described in more detail with reference to the following figures, the suction jaws 20a, 20b can be moved in the Y direction with the drive unit 50. Furthermore, the drive unit 50 serves to pivot the two suction jaws 20a, 20b at their base on the gripping jaw guide assembly 30. A sensor unit 2 is also arranged on the gripping jaw guide assembly 30. In FIG. 1b, it can be seen that a control device 4 is arranged on a rotary joint below the actual gripper 1 and can be coupled to the various components of the gripper 1 (e.g., sensor unit 2, gripping jaw guide assembly 30). In one or more embodiments, the control unit 4 may be arranged further away from the actual gripper 1. The rotary joint is coupled via an arm 3 to a movement mechanism (not shown) with which the gripper 1 is moved in the picking device.

As shown in the figures, two gripping jaws of the gripper 1 are designed as suction jaws 20a, 20b. At the distal ends thereof, both suction jaws 20a, 20b include a suction device 70a, 70b, each which are coupled to a suction line 81a, 81b (see FIG. 1a). As shown, the two suction lines 81a, 81b run at least in portions through the suction jaws 20a, 20b and end at the suction devices 70a, 70b. As can be seen in FIG. 1a, the two suction lines 81a, 81b are brought together extending from the suction jaws 20a, 20b in the rear portion of the gripping jaw guide assembly 30. Via the suction lines 81a, 81b, the suction devices 70a, 70b can optionally be subjected to a vacuum separately from one another. How the suction lines 81a, 81b are continued in detail is not substantial for the present disclosure and is therefore not explained further. It is only substantial that a vacuum can be applied to the suction devices 20a, 20b by the suction lines 81a, 81b. In some aspects of the disclosure, the suction lines may be routed outside the suction jaws 20a, 20b, for example on the outer surfaces of the suction jaws 20a, 20b.

Figure 2:
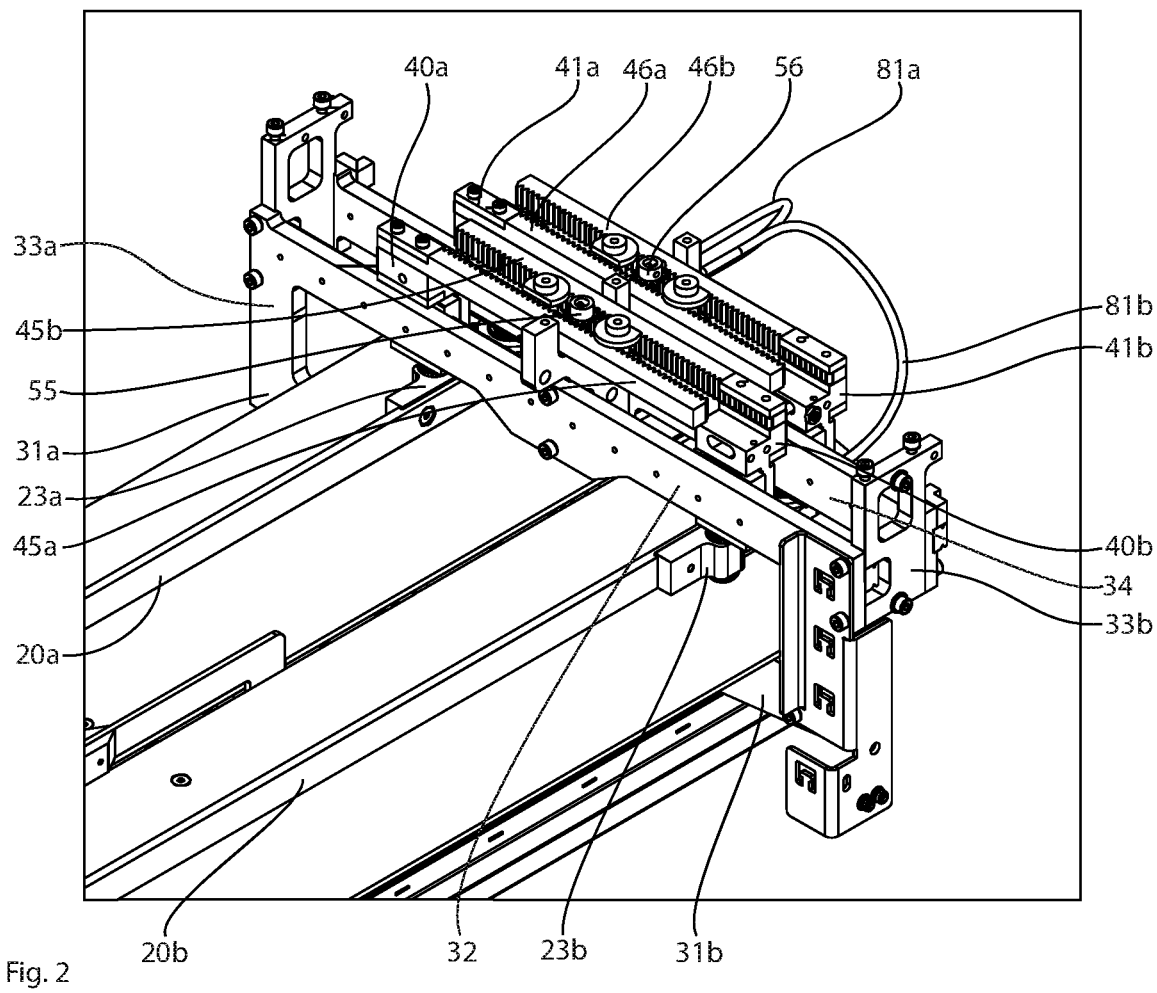
FIG. 2 is a partial perspective view of the gripper of FIG. 1a in the region of a gripping jaw guide assembly, according to aspects of the disclosure.
Figure 3:
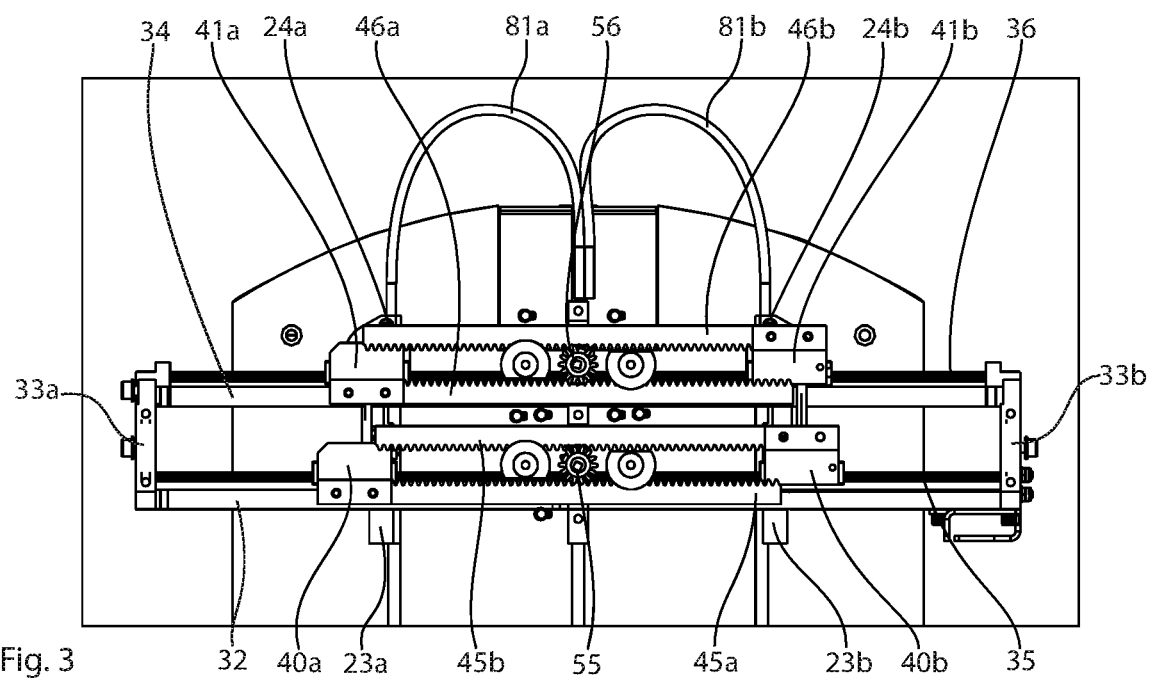
FIG. 3 is a top view of the gripper of FIG. 2, according to aspects of the disclosure.

FIGS. 2 and 3 show detailed views of the gripping jaw guide assembly 30, wherein FIG. 2 shows a perspective view and FIG. 3 shows a top view. In the views according to FIGS. 2 and 3, the drive unit 50, the sensor unit 2, and parts of the housing of the gripping jaw guide assembly 30 have been omitted in order to show the internal components which are used for moving and pivoting the suction jaws 20a, 20b.

As already explained above, the gripper 1 may be designed such that both suction jaws 20a, 20b can be moved in the Y direction and can be pivoted at the base of the gripping jaw guide assembly 30. The gripper according to the disclosure shown in the drawing thus offers considerable flexibility with regard to the handling of small piece goods. Small piece goods having a typical rectangular shape can be moved from a delivery location onto the delivery table 10 without pivoting the suction jaws 20a, 20b using one or two suction devices 70a, 70b. If a small piece good has an unusual design, for example with a very uneven surface that prevents holding and moving by the suction devices 70a, 70b, the suction jaws 20a, 20b can also be pivoted, as is possible with known grippers, in order to move these unusual pharmaceutical packages onto the delivery table 10.

The gripping jaw guide assembly 30 includes two lateral frame structure components 33a, 33b, between which two transverse components 32, 34 extend parallel to one another in the Y direction and spaced apart in the X direction, wherein a first guide 35 is arranged on the transverse component 32 and a second guide 36 is arranged on the transverse component 34, as can be seen in FIG. 3. Two slides 40a, 40b, 41a, 41b are arranged on each of the guides 35, 36, with two first slides 40a, 40b on the first guide 35 and two second slides 41a, 41b on the second guide 36. In the gripper 1 according to the disclosure, portions of the slides 40a, 40b, 41a, 41b engage around projections of the guides 35, 36, so that the slides 40a, 40b, 41a, 41b rest on these projections and are movable on the guides 35, 36 in the Y direction.

The slides 40a, 40b, 41a, 41b are coupled to drive elements 45a, 46a, 45b, 46b, which are shown as toothed racks. The drive elements 45a, 45b are assigned to the first guide 35 or the corresponding first slides 40a, 40b, respectively, and the corresponding drive elements 46a, 46b are assigned to the second guide 36 and are oriented with respect to the toothed elements of the toothed racks in such a way that the toothed elements lie opposite one another and the free ends thereof form an overlap region. A drive gear 55, 56 is arranged in the center in the overlap region of the drive elements 45a, 46a, 45b, 46b or toothed racks, which drive gear 55, 56 is coupled to the drives 51, 52 via a gear 53, 54 (see FIG. 1a). The distance between the slides 40a, 40b, 41a, 41b of a guide 35, 36 and the corresponding drive gear 55, 56 is identical, from which it follows that a drive gear 55, 56 is arranged exactly in the center between two slides 40a, 40b, 41a, 41b, so that a movement of the drive gear 55, 56 causes synchronous movements of the slides 40a, 40b, 41a, 41b. When the drive gear 55, 56 rotates, the corresponding slides 40a, 40b, 41a, 41b are thus moved synchronously towards or away from one another, wherein this is the case for the two slide groups 40a, 40b and 41a, 41b assigned to the guides 35 and 36.

The slides 40a, 40b of the first guide 35 can be moved separately or simultaneously with the slides 41a, 41b of the second guide 36, so that there is great flexibility with regard to the movement of the slides 40a, 40b, 41a, 41b. Since the slides 40a, 40b, 41a, 41b of the first guide 35 and the second guide 36 are spaced apart from one another in the X direction, this means that by controlling the movement of the slides 40a, 40b, 41a, 41b, the suction jaws 20a, 20b that are coupled to the slides 40a, 40b, 41a, 41b can be moved and pivoted in the Y direction. A movement in the Y direction occurs when the slides 40a, 40b, 41a, 41b of the first and second guides 35, 36 assigned to a suction jaw 20a, 20b are moved synchronously. For example, if only one of the two slides 40a, 40b, 41a, 41b assigned to each suction jaw 20a, 20b is moved, this causes the pivoting of the corresponding suction jaw 20a, 20b.

As already stated, the suction jaws 20a, 20b are coupled to the slides 40a, 40b, 41a, 41b described above. This coupling is indicated in FIG. 3. According to aspects of the disclosure as shown, the suction jaws 20a, 20b are each connected via a joint 23a, 24a, 23b, 24b to the slides 40a, 41a, 40b, 41b. Since pivoting of the suction jaws 20a, 20b requires a change in distance between the slides 40a, 40b, 41a, 41b assigned to a suction jaw 20a, 20b, an elongated hole guide is provided, for example, in the case of a joint assigned to a suction jaw 20a, 20b. For further details regarding the structure of the gripping jaw guide assembly 30 of the embodiments shown, reference is made to the European patent application EP 20 153 879.0, wherein the disclosure thereof is hereby explicitly included in its entirety for all purposes.

Figure 4:
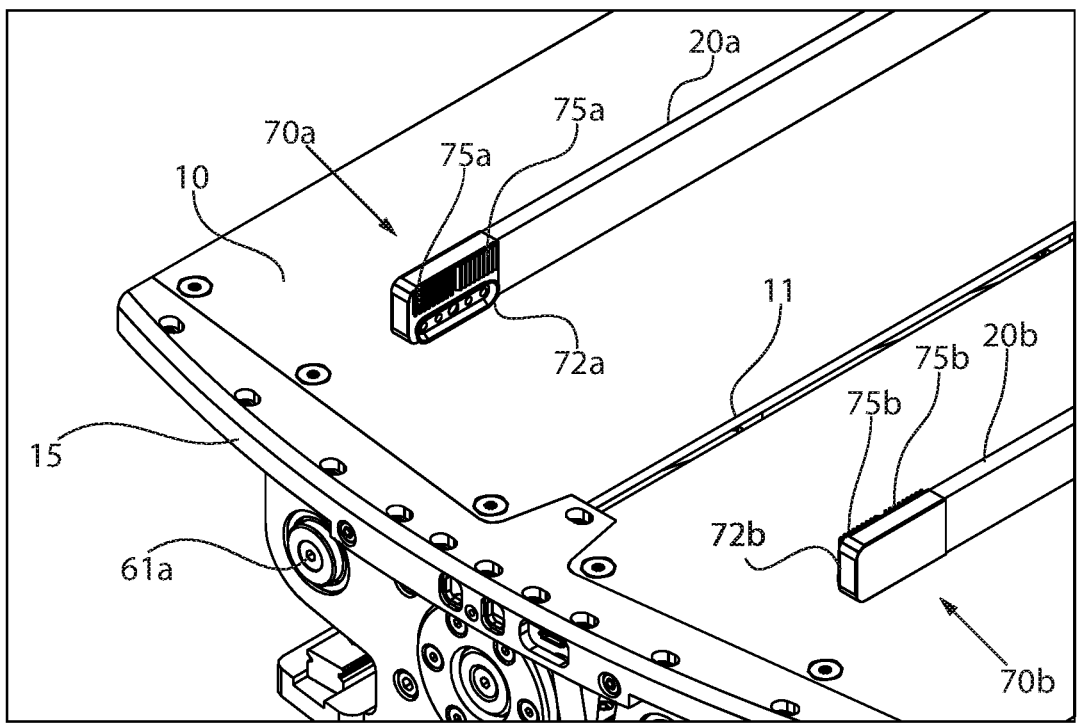
FIG. 4 is a partial perspective view of the gripper of FIG. 1a in the region of a gripper tip, according to aspects of the disclosure.
Figure 5:
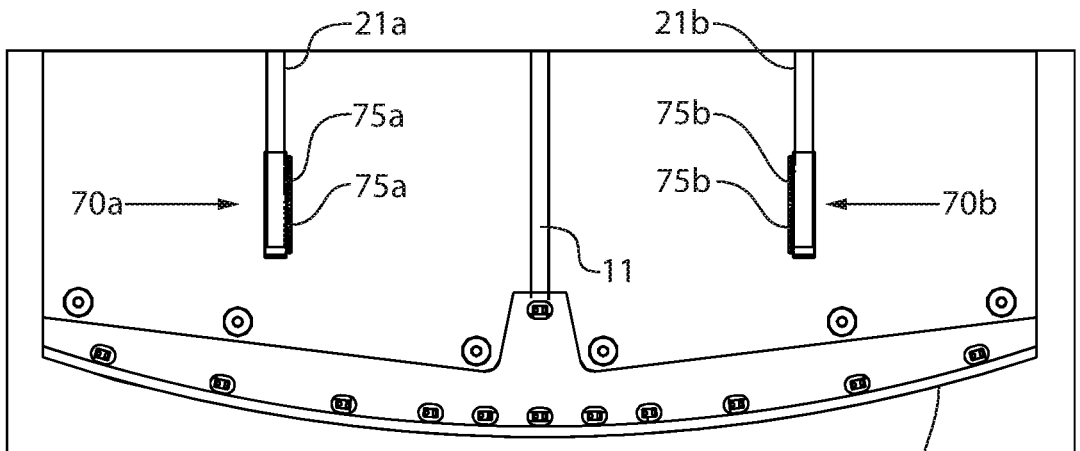
FIG. 5 is a top view of the gripper of FIG. 4, according to aspects of the disclosure.

FIGS. 4 and 5 show detailed views of the loading and unloading end of the gripper 1, in particular the suction devices 70a, 70b are shown. As can be seen in FIGS. 4 and 5, the suction jaws 20a, 20b may each have a suction device 70a, 70b at the distal end of the suction jaw 20a, 20b. As shown, the suction device 70a, 70b includes a suction surface 72a, 72b in the form of an elongated hole, so the shape of the suction surface 72a, 72b is substantially adapted to the shape of the suction jaws 20a, 20b. In aspects of the disclosure, two adhesive elements 75a, 75b are arranged above the suction surfaces 72a, 72b of the suction devices 70a, 70b, which have an increased coefficient of adhesive friction compared to the suction jaw surfaces 21a, 21b. As can be seen in particular in FIG. 5, the adhesive elements 75a, 75b shown are implemented by a plurality of elastic elevations that protrude beyond the plane of the suction surface 72a, 72b. If a small piece good is suctioned using the suction devices 70a, 70b, the elevations are compressed, and the adhesive friction between the small piece good and the suction jaw 20a, 20b is increased compared to an adhesive friction without the adhesive elements. This results in the possibility of reducing the negative pressure applied to the suction devices 70a, 70b compared to a gripper 1 not having adhesive elements 75a, 75b, which results in energy savings.

Figure 6:
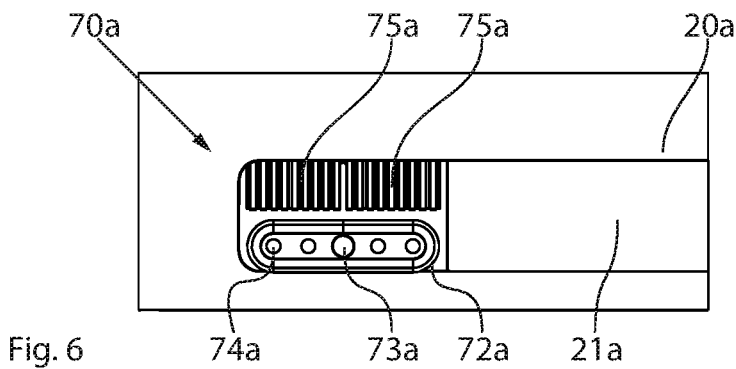
FIG. 6 is a side view of a suction device on a suction jaw, according to aspects of the disclosure.

FIG. 6 shows the detailed view of a suction device 70a, in which two adhesive elements 75a are likewise arranged above the suction surface 72a. As can be seen in FIG. 6, the suction device 70a shown includes a central suction opening 73a, which is surrounded on both sides by two elevations 74a, which are intended to prevent a surface of the piece good or the suction lip defining the suction surface 72a from completely pressing against the central suction opening 73a or the suction surface 72a from being indented. Suction device 70b may be configured similarly. In aspects of the disclosure, the shape of the suction surface 72a can vary, as can the number of suction openings 73a and elevations 74a. Suction device 70b may be configured similarly as suction device 70a.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A gripper for a picking device having horizontal storage surfaces for storing small piece goods, the gripper comprising:
   a delivery table extending in a first horizontal direction and a second horizontal direction orthogonal to the first horizontal direction;
   a gripping jaw guide assembly having two gripping jaws extending in the first horizontal direction over the delivery table, wherein at least one of the gripping jaws is movable in the second horizontal direction; and
   a drive unit coupled to the gripping jaw guide assembly and configured to move the gripping jaw guide assembly in the first horizontal direction,
   wherein at least one of the gripping jaws is a suction jaw comprising a suction device having a suction surface for suctioning a small piece good, a suction line and an adhesive element arranged adjacent to the suction surface, the adhesive element having an increased adhesive friction coefficient compared to a surface of the suction jaw, wherein the suction device is configured to apply a vacuum using the suction line.

2. The gripper of claim 1, wherein the suction line extends at least in portions through the suction jaw itself.

3. The gripper of claim 1, wherein the suction line is guided at least in portions on the suction jaw itself.

4. The gripper of claim 1, wherein the suction device of the suction jaw is arranged at a distal end of the suction jaw.

5. The gripper of claim 1, wherein the suction surface of the suction device is oval-shaped.

6. The gripper of claim 1, wherein each of the two gripping jaws are suction jaws.

7. The gripper of claim 6, wherein the suction device of one of the suction jaws has a suction surface adapted to curved surfaces of small piece goods.

8. The gripper of claim 1, wherein at least one of the gripping jaws is arranged pivotably on the gripping jaw guide assembly.

9. The gripper of claim 1, wherein the adhesive element comprises a plurality of elastic elevations.

10. The gripper of claim 9, wherein the plurality of elastic elevations protrude beyond a plane of the suction surface.

11. The gripper of claim 9, wherein the plurality of elastic elevations are configured to compress when the small piece good is suctioned by the suction device.

12. The gripper of claim 1, wherein the suction device comprises a central suction opening disposed within the suction surface.

13. The gripper of claim 12, wherein the suction device comprises a plurality of elevations, at least one elevation disposed on each side of the central suction opening.

14. The gripper of claim 13, wherein the plurality of elevations are configured to prevent one of a surface of the small piece good from completely pressing against the central suction opening, a lip defining the suction surface from completely pressing against the central suction opening and the suction surface from being indented.

15. A picking device for small piece goods, comprising:
    a gripper comprising:
        a delivery table extending in a first horizontal direction and a second horizontal direction orthogonal to the first horizontal direction;
        a gripping jaw guide assembly having two gripping jaws extending in the first horizontal direction over the delivery table, wherein at least one of the gripping jaws is movable in the second horizontal direction, and wherein at least one of the gripping jaws is a suction jaw comprising:
            a suction device having a suction surface for suctioning a small piece good;
            an adhesive element arranged adjacent to the suction surface of the suction device, the adhesive element having an increased adhesive friction coefficient compared to a surface of the suction jaw; and
            a suction line, wherein the suction device is configured to apply a vacuum using the suction line; and
        a drive unit coupled to the gripping jaw guide assembly and configured to move the gripping jaw guide assembly in the first horizontal direction;
    a sensor unit disposed on the gripper; and
    a control device coupled to the gripper.

16. The picking device of claim 15, further comprising a rotary joint coupled to the gripper, wherein the control device is disposed on the rotary joint.

17. The picking device of claim 15, wherein the adhesive element comprises a plurality of elastic elevations that protrude beyond a plane of the suction surface, the plurality of elastic elevations configured to compress when the small piece good is suctioned by the suction device.

18. The picking device of claim 15, wherein the suction device comprises:
    a central suction opening disposed within the suction surface; and
    a plurality of elevations, at least one elevation disposed on each side of the central suction opening,
    wherein the plurality of elevations are configured to prevent one of a surface of the small piece good from completely pressing against the central suction opening, a lip defining the suction surface from completely pressing against the central suction opening and the suction surface from being indented.

* * * * *